US012646204B2

(12) United States Patent
Kawabata et al.

(10) Patent No.: US 12,646,204 B2
(45) Date of Patent: Jun. 2, 2026

(54) ANGLE DETECTING DEVICE, STORAGE MEDIUM STORING COMPUTER PROGRAM FOR ANGLE DETECTION AND ANGLE DETECTING METHOD

(71) Applicants: TOYOTA JIDOSHA KABUSHIKI KAISHA, Toyota (JP); DENSO CORPORATION, Kariya-city (JP)

(72) Inventors: Masahiro Kawabata, Tokyo-to (JP); Ken Tanabe, Tokyo-to (JP)

(73) Assignees: TOYOTA JIDOSHA KABUSHIKI KAISHA, Toyota (JP); DENSO CORPORATION, Kariya (JP)

( * ) Notice: Subject to any disclaimer, the term of this patent is extended or adjusted under 35 U.S.C. 154(b) by 390 days.

(21) Appl. No.: 18/545,220

(22) Filed: Dec. 19, 2023

(65) Prior Publication Data

US 2024/0273757 A1 Aug. 15, 2024

(30) Foreign Application Priority Data

Feb. 13, 2023 (JP) ................................. 2023-019945

(51) Int. Cl.
$G06T$ *7/73* (2017.01)
$B62D$ *15/02* (2006.01)

(52) U.S. Cl.
CPC .............. *G06T 7/73* (2017.01); *B62D 15/024* (2013.01); *G06T 2207/30252* (2013.01)

(58) Field of Classification Search
CPC ............ G06T 7/73; G06T 2207/30252; B62D 15/024; B60R 1/22; B60R 2300/80; G01B 11/26
See application file for complete search history.

(56) References Cited

U.S. PATENT DOCUMENTS

| | | | | |
|---|---|---|---|---|
| 9,607,242 B2 * | 3/2017 | Lavoie | .................. | G06V 20/56 |
| 10,829,046 B2 | 11/2020 | Nagasamy | | |
| 2018/0121742 A1 * | 5/2018 | Son | ...................... | B62D 15/021 |
| 2019/0359134 A1 * | 11/2019 | Yamamoto | ............. | B62D 13/00 |

(Continued)

FOREIGN PATENT DOCUMENTS

| | | |
|---|---|---|
| JP | 2013-256156 A | 12/2013 |
| JP | 2020-017170 A | 1/2020 |

OTHER PUBLICATIONS

Bahramgiri, Mojtaba, et al. "Hitch angle estimation for trailer backup system—an object detection and tracking approach." IEEE Transactions on Instrumentation and Measurement 71 (2022): 1-15. (Year: 2022).*

*Primary Examiner* — Utpal D Shah
(74) *Attorney, Agent, or Firm* — Oliff PLC

(57) ABSTRACT

An angle detecting device has a processor configured to detect a first point and a second point indicating parts of rear of the towing vehicle within a first plane, a third point and a fourth point indicating parts of front of the towed vehicle within a second plane from within an image that includes the rear of the towing vehicle and the front of the towed vehicle, project the first to fourth points onto a projection plane parallel to ground and calculate fifth to eighth points, and calculate an angle formed between a first straight line connecting the fifth point and sixth point and a second straight line connecting the seventh point and eighth point in the projection plane as the relative angle of the towed vehicle with respect to the towing vehicle.

5 Claims, 5 Drawing Sheets

(56) References Cited

U.S. PATENT DOCUMENTS

| | | | |
|---|---|---|---|
| 2020/0175707 A1* | 6/2020 | Diessner | G06T 7/74 |
| 2020/0285913 A1 | 9/2020 | Gavrilovic et al. | |
| 2021/0309148 A1* | 10/2021 | Watanabe | B60R 1/27 |
| 2022/0024391 A1* | 1/2022 | Gali | G06T 7/73 |
| 2023/0196609 A1* | 6/2023 | Klinger | G06T 7/73 |
| | | | 701/28 |
| 2023/0234504 A1* | 7/2023 | Vasoya | B60D 1/06 |
| | | | 280/477 |
| 2023/0322032 A1* | 10/2023 | Plowman | B60D 1/62 |
| | | | 340/431 |
| 2024/0202970 A1* | 6/2024 | Olutomilayo | G06T 7/74 |
| 2024/0239366 A1* | 7/2024 | Topolovec | B60R 11/04 |

* cited by examiner

COORDINATE CONVERSION
PROCESSING

S201

CONVERSION OF FISHEYE IMAGE
TO FLAT IMAGE

S202

CONVERSION FROM
IMAGE COORDINATE SYSTEM
TO CAMERA COORDINATE SYSTEM

S203

CONVERSION FROM
CAMERA COORDINATE SYSTEM
TO WORLD COORDINATE SYSTEM

END

ANGLE DETECTING DEVICE, STORAGE MEDIUM STORING COMPUTER PROGRAM FOR ANGLE DETECTION AND ANGLE DETECTING METHOD

FIELD

The present disclosure relates to an angle detecting device, a storage medium storing a computer program for angle detection, and an angle detecting method.

BACKGROUND

Automatic control systems are often mounted on towing vehicles (passenger vehicles). A towing vehicle travels while towing a connected towed vehicle (trailer).

An automatic control system mounted in a towing vehicle detects the positional relationship of the towed vehicle with respect to the towing vehicle, and controls the towing vehicle based on the positional relationship with the towed vehicle.

Information indicating the positional relationship of the towed vehicle with respect to the towing vehicle includes the angle of the towed vehicle with respect to the towing vehicle. The automatic control system controls operation of the towing vehicle while it travels on a curved road, based on the angle of the towed vehicle with respect to the towing vehicle. The automatic control system likewise controls operation of the towing vehicle based on the angle of the towed vehicle with respect to the towing vehicle, when backing up to park.

Japanese Unexamined Patent Publication No. 2013-256156, for example, proposes calculating the angle of a towed vehicle with respect to the towing vehicle based on two images taken by a stereo camera.

SUMMARY

Since the angle of the towed vehicle with respect to the towing vehicle is calculated using two images in the technique described in Japanese Unexamined Patent Publication No. 2013-256156, the process for determining the angle is complex.

It is an object of the present disclosure to provide an angle detecting device which allows the angle of a towed vehicle with respect to its towing vehicle to be easily determined.

(1) One embodiment of the invention provides an angle detecting device. The angle detecting device calculates a relative angle between a towing vehicle and a towed vehicle which are connected in a rotatable manner via a connecting part provided on the towing vehicle, and the angle detecting device has a processor configured to detect a first point indicating part of rear of the towing vehicle within a first plane perpendicular to a longitudinal direction of the towing vehicle, a second point indicating another part of the rear of the towing vehicle within the first plane and at the same height from ground as the first point, a third point indicating part of front of the towed vehicle within a second plane perpendicular to a lengthwise direction of the connecting part, and a fourth point indicating another part of the front of the towed vehicle within the second plane and at the same height from the ground as the third point, from an image that includes the rear of the towing vehicle and the front of the towed vehicle, project the first point, second point, third point and fourth point detected onto a projection plane parallel to the ground and calculate a fifth point, sixth point, seventh point and eighth point corresponding to the first point, second point, third point and fourth point, and calculate an angle formed between a first straight line connecting the fifth point and sixth point and a second straight line connecting the seventh point and eighth point, in the projection plane, as the relative angle of the towed vehicle with respect to the towing vehicle.

(2) In the angle detecting device of (1), it is preferable that the processor is further configured to detect the first point, second point, third point and fourth point from the image using a classifier trained so as to identify from the image the first point indicating part of the rear of the towing vehicle within the first plane perpendicular to the longitudinal direction of the towing vehicle, the second point indicating another part of the rear of the towing vehicle within the first plane and at the same height from the ground as the first point, the third point indicating part of the front of the towed vehicle within the second plane perpendicular to the lengthwise direction of the connecting part and the fourth point indicating another part of the front of the towed vehicle within the second plane and at the same height from the ground as the third point.

(3) In the angle detecting device of (1) or (2), it is preferable that the first point and the second point represent locations at the lower end of the rear of the towing vehicle, and the processor is further configured to convert the first point, second point, third point and fourth point represented in an image coordinate system to the first point, second point, third point and fourth point represented in a camera coordinate system, using the heights of the locations at the lower end of the rear of the towing vehicle, and to convert the first point, second point, third point and fourth point represented in the camera coordinate system to the first point, second point, third point and fourth point represented in a world coordinate system, and then to project the first point, second point, third point and fourth point represented in the world coordinate system onto the projection plane and calculate the fifth point, sixth point, seventh point and eighth point.

Another embodiment of the invention provides a computer-readable non-transitory storage medium storing a computer program for angle detection. The computer program for angle detection calculates a relative angle between a towing vehicle and a towed vehicle which are connected in a rotatable manner via a connecting part provided on the towing vehicle, and causes a processor to execute a process and the process includes detecting a first point indicating part of rear of the towing vehicle within a first plane perpendicular to a longitudinal direction of the towing vehicle, a second point indicating another part of the rear of the towing vehicle within the first plane and at the same height from ground as the first point, a third point indicating part of front of the towed vehicle within a second plane perpendicular to a lengthwise direction of the connecting part, and a fourth point indicating another part of the front of the towed vehicle within the second plane and at the same height from the ground as the third point, from an image that includes the rear of the towing vehicle and the front of the towed vehicle, projecting the first point, second point, third point and fourth point onto a projection plane parallel to the ground and calculating a fifth point, sixth point, seventh point and eighth point corresponding to the first point, second point, third point and fourth point, and calculating an angle formed between a first straight line connecting the fifth point and sixth point and a second straight line connecting the seventh point and eighth point, in the projection plane, as the relative angle of the towed vehicle with respect to the towing vehicle.

(5) Another embodiment of the invention provides an angle detecting method. The angle detecting method is carried out by an angle detecting device and calculates a relative angle between a towing vehicle and a towed vehicle connected in a rotatable manner via a connecting part provided on the towing vehicle and the method includes detecting a first point indicating part of rear of the towing vehicle within a first plane perpendicular to a longitudinal direction of the towing vehicle, a second point indicating another part of the rear of the towing vehicle within the first plane and at the same height from ground as the first point, a third point indicating part of front of the towed vehicle within a second plane perpendicular to a lengthwise direction of the connecting part, and a fourth point indicating another part of the front of the towed vehicle within the second plane and at the same height from the ground as the third point, from an image that includes the rear of the towing vehicle and the front of the towed vehicle, projecting the first point, second point, third point and fourth point onto a projection plane parallel to the ground and calculating a fifth point, sixth point, seventh point and eighth point corresponding to the first point, second point, third point and fourth point, and calculating an angle formed between a first straight line connecting the fifth point and sixth point and a second straight line connecting the seventh point and eighth point, in the projection plane, as the relative angle of the towed vehicle with respect to the towing vehicle.

The angle detecting device of the disclosure can easily calculate the relative angle of the towed vehicle with respect to the towing vehicle based on a single image that includes the rear of the towing vehicle and the front of the towed vehicle.

The object and advantages of the invention will be realized and attained by means of the elements and combinations particularly indicated in the claims. It is to be understood that both the foregoing general description and the following detailed description are exemplary and explanatory and are not restrictive of the invention, as claimed.

DESCRIPTION OF EMBODIMENTS

Figure 1A:
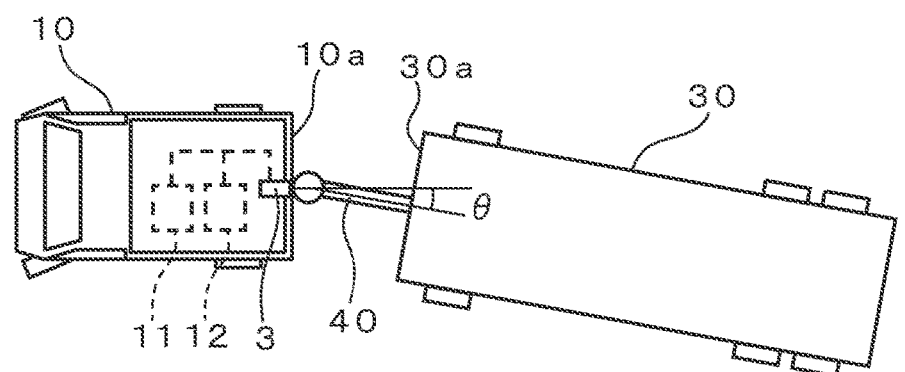
FIG. 1A is a plan view of a towing vehicle and towed vehicle, to illustrate operation of the angle detecting device of the embodiment in overview.
Figure 1B:
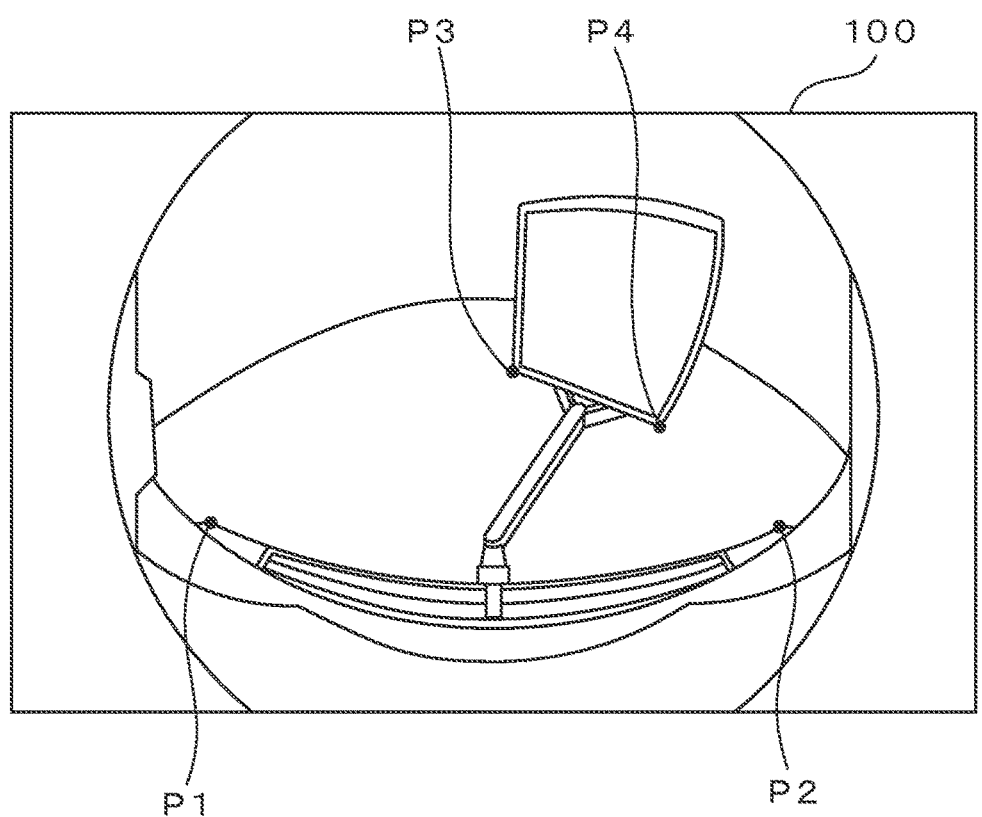
FIG. 1B is a diagram showing an example of a rear image, to illustrate operation of the angle detecting device of the embodiment in overview.
Figure 2:
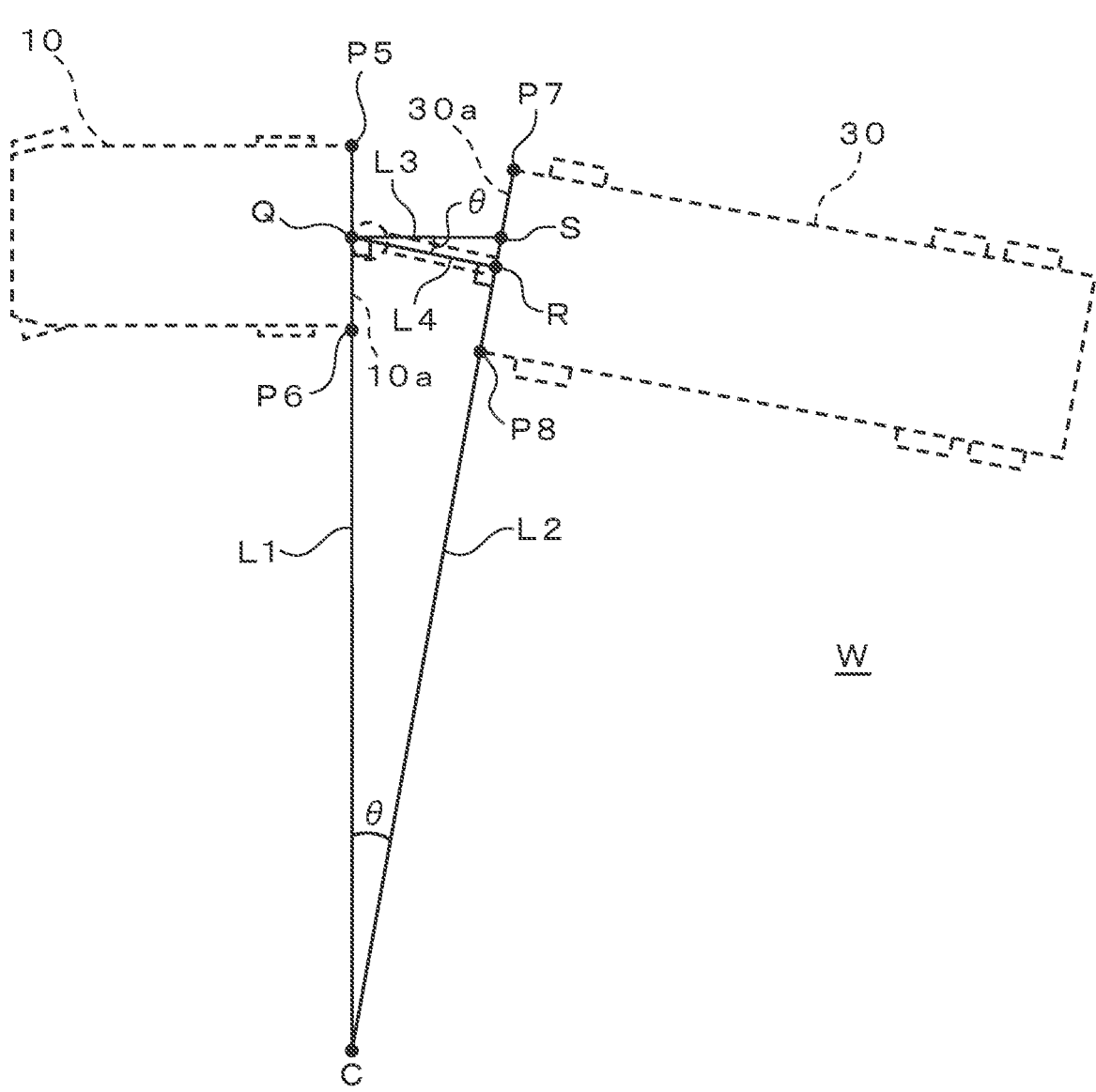
FIG. 2 is a diagram for angle calculation, to illustrate operation of the angle detecting device of the embodiment in overview.

FIG. 1A, FIG. 1B and FIG. 2 are diagrams illustrating operation of an angle detecting device according to an embodiment in overview. FIG. 1A is a plan view of a vehicle 10 and a towed vehicle 30, and FIG. 1B is a diagram showing an example of a rear image. FIG. 2 shows calculation of an angle. Operation for angle detection processing by the angle detecting device 12 disclosed herein will now be described in overview with reference to FIG. 1A, FIG. 1B and FIG. 2.

A towing vehicle 10 (hereunder also referred to simply as "vehicle 10") tows a towed vehicle 30. The towed vehicle 30 is connected to the vehicle 10 in a rotatable manner via a connecting part 40 that extends in a certain direction.

The vehicle 10 has an automatic control device 11 and an angle detecting device 12. The angle detecting device 12 detects the relative angle between the towed vehicle 30 and the vehicle 10. Based on the relative angle, the automatic control device 11 controls operation of the vehicle 10 as it travels while towing the towed vehicle 30. The vehicle 10 may also be a self-driving vehicle.

The connecting part 40 has an overall rod-like shape. The connecting part 40 connects the center in the widthwise direction at the lower end of the back side 10a of the vehicle 10 with the center in the widthwise direction at the lower end of the front side 30a of the towed vehicle 30. The widthwise direction is the direction perpendicular to the longitudinal direction of each vehicle. When the vehicle 10 tows the towed vehicle 30 straight, the longitudinal direction of the vehicle 10 matches the longitudinal direction of the towed vehicle 30. Moreover when the vehicle 10 tows the towed vehicle 30 straight, the lengthwise direction of the connecting part 40 matches the longitudinal directions of the vehicle 10 and towed vehicle 30.

One end of the connecting part 40 has a hollow hemispherical shape, for example, and fits in a rotatable manner with a spherical fitting section (not shown) of the vehicle 10. The other end of the connecting part 40 is anchored to the towed vehicle 30. The connecting part 40 extends perpendicular to the front side 30a of the towed vehicle 30. The connecting part 40 does not need to be rod-like so long as it has an anisotropic shape that extends in a certain direction.

The angle θ formed by the connecting part 40 with respect to the direction perpendicular to the back side 10a of the towing vehicle 10, within the plane parallel to the ground, is the relative angle of the towed vehicle 30 with respect to vehicle 10. When the vehicle 10 is straight, the relative angle is essentially zero. This relative angle may also be referred to herein as the "relative angle of the towed vehicle 30 with respect to the towing vehicle 10".

In the example shown in FIG. 1A, the vehicle 10 is turning toward the left. As the vehicle 10 turns, the towed vehicle 30 is towed at the relative angle θ with respect to the vehicle 10.

The automatic control device 11 controls operation of the vehicle 10 while it travels on a curved road, based on the relative angle of the towed vehicle 30 with respect to the towing vehicle 10, so that the towed vehicle 30 is safely towed. The automatic control device 11 also controls operation of the vehicle 10 based on the relative angle of the towed vehicle 30 with respect to the towing vehicle 10 when backing up into a parking spot, so that the towed vehicle 30 fits into the parking spot.

A camera 3 takes a rear image that includes the rear of the vehicle 10 and the front of the towed vehicle 30. For example, the rear image 100 is taken to include the lower end of the back side 10a of the vehicle 10 and the lower end of the front side 30a of the towed vehicle 30, as shown in FIG. 1B.

From the rear image 100, the angle detecting device 12 detects a first point P1 indicating part of the rear of the towing vehicle 10 that is within a first plane perpendicular to the longitudinal direction of the towing vehicle 10, and a second point P2 indicating another part of the rear of the towing vehicle 10 that is within the first plane and at the same height from the ground as the first point P1.

From the rear image 100, the angle detecting device 12 also detects a third point P3 indicating part of the front of the towed vehicle 30 that is within a second plane perpendicular to the lengthwise direction of the connecting part 40, and a fourth point P4 indicating another part of the front of the towed vehicle 30 that is within the second plane and at the same height from the ground as the third point P3.

In the example shown in FIG. 1B, the first plane corresponds to the back side 10a of the vehicle 10. The first point P1 and second point P2 correspond to locations at the left and right ends of the lower end of the back side 10a. The second plane corresponds to the front side 30a of the towed vehicle 30. The third point P3 and fourth point P4 correspond to locations at the left and right of the front side 30a. The first point P1, second point P2, third point P3 and fourth point P4 are represented on the camera coordinate system having origin at the imaging surface of the camera 3, for example.

As shown in FIG. 2, the angle detecting device 12 projects the first point P1, second point P2, third point P3 and fourth point P4 onto a projection plane W parallel to the ground, to calculate a fifth point P5, sixth point P6, seventh point P7 and eighth point P8 corresponding to the first point P1, second point P2, third point P3 and fourth point P4. The fifth point P5, sixth point P6, seventh point P7 and eighth point P8 are represented on the world coordinate system with an origin at a predetermined reference location in real space, for example.

The angle detecting device 12 calculates the angle θ formed between a first straight line L1 connecting the fifth point P5 and sixth point P6 and a second straight line L2 connecting the seventh point P7 and eighth point P8, within the projection plane W, to be the relative angle between the towed vehicle 30 and the vehicle 10. The relative angle θ matches the direction in which the connecting part 40 extends from the back side 10a of the vehicle 10.

The angle detecting device 12 notifies the automatic control device 11 of the relative angle θ. Based on the relative angle θ, the automatic control device 11 controls operation of the vehicle 10 as it travels while towing the towed vehicle 30.

As explained above, the angle detecting device 12 can easily calculate the relative angle of the towed vehicle 30 with respect to the vehicle 10 based on a single rear image 100 that includes the rear of the vehicle 10 and the front of the towed vehicle 30.

Figure 3:
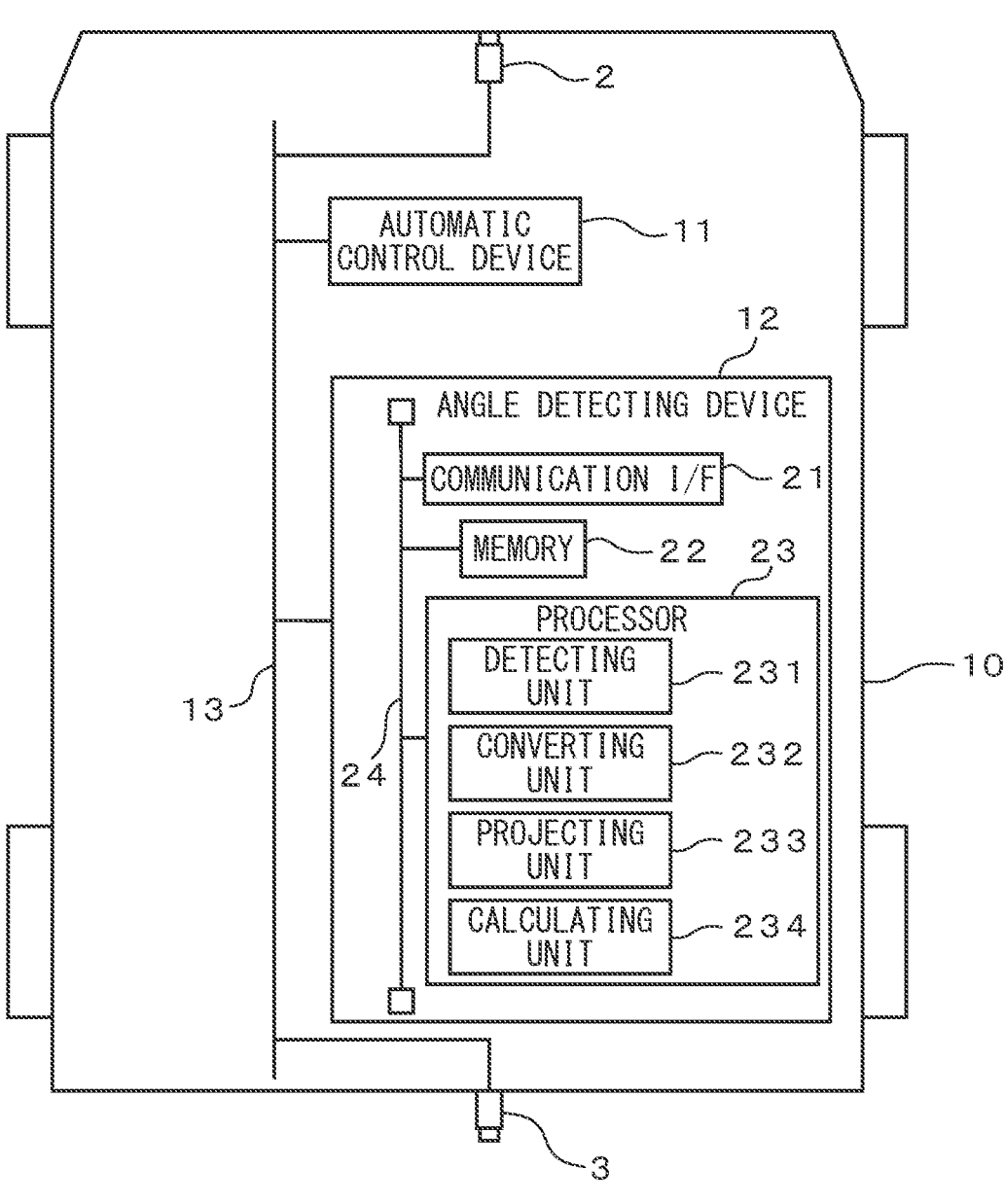
FIG. 3 is a hardware configuration diagram for a vehicle in which the angle detecting device of the embodiment is mounted.

FIG. 3 is a hardware configuration diagram for the vehicle 10 in which the angle detecting device 12 of the embodiment is mounted. The vehicle 10 has a front camera 2, a rear camera 3, the automatic control device 11 and the angle detecting device 12. The vehicle 10 may also have a LiDAR sensor, as another distance sensor (not shown) for measurement of the distance of the vehicle 10 to surrounding objects.

The front camera 2, rear camera 3, automatic control device 11 and angle detecting device 12 are connected in a communicable manner via an in-vehicle network 13 conforming to the Controller Area Network standard.

The front camera 2 is mounted on the vehicle 10 and directed toward the front of the vehicle 10. The front camera 2, for example, takes a front image in which the environment of a predetermined region ahead of the vehicle 10 is shown, at a predetermined cycle. The front image can show the road in the predetermined region ahead of the vehicle 10, and road features such as surface lane marking lines on the road. A front image taken by the front camera 2 may also include other vehicles which are located in front of the vehicle 10. The front camera 2 has a 2D detector composed of an array of photoelectric conversion elements with visible light sensitivity, such as a CCD or C-MOS, and an imaging optical system that forms an image of the photographed region on the 2D detector.

Each time a front image is taken, the front camera 2 outputs the front image and camera imaging time at which the front image was taken to the automatic control device 11 via the in-vehicle network 13. At the automatic control device 11, the camera image is used for processing to detect objects surrounding the vehicle 10.

The rear camera 3 is mounted on the vehicle 10 and directed toward the rear of the vehicle 10. The rear camera 3, for example, takes a rear image in which the environment of a predetermined region behind of the vehicle 10 is shown, at a predetermined cycle. The rear image shows the environment within a predetermined region behind the vehicle 10.

The rear camera 3 is preferably mounted on the vehicle 10 at the top end of the back side 10a of the vehicle 10 so as to be directed to the front side 30a of the towed vehicle 30. The rear camera 3 is also preferably mounted on the vehicle 10 so that its visual field includes the lower end of the back side 10a of the vehicle 10 and the lower end of the front side 30a of the towed vehicle 30.

The rear camera 3 has a 2D detector composed of an array of photoelectric conversion elements with visible light sensitivity, such as a CCD or C-MOS, and an imaging optical system that forms an image of the photographed region on the 2D detector. The rear camera 3 is preferably a fisheye camera capable of taking fisheye images, from the viewpoint of capturing a wide visual field in the rear image.

Each time a rear image is taken, the rear camera 3 outputs the rear image and rear imaging time at which the rear image was taken to the angle detecting device 12 via the in-vehicle network 13. The rear image is used by the angle detecting device 12 for processing to calculate the relative angle of the towed vehicle 30 with respect to the vehicle 10.

The automatic control device 11 controls operation including traveling of the vehicle 10. The automatic control device 11 recognizes the environment surrounding the vehicle 10 based on the front image taken by the front camera 2. The automatic control device 11 also generates a driving plan to control operation including steering, driving and braking, based on the recognized environment surrounding the vehicle 10 and the relative angle of the towed vehicle 30 with respect to the vehicle 10. The automatic control device 11 then generates the driving plan within a range of restrictions given the state of the towed vehicle 30 as the vehicle 10 is traveling, based on the relative angle of the towed vehicle 30 with respect to the vehicle 10 output from the angle detecting device 12. The restrictions given the state of the towed vehicle 30 as the vehicle 10 is traveling may be its acceleration, deceleration, yaw rate and angular acceleration. The automatic control device 11 outputs the automatic control signal based on the driving plan, to an actuator (not shown) that controls the steering wheel, a drive unit (not shown), or the brake (not shown), via the in-vehicle network 13.

The angle detecting device 12 carries out detection processing, conversion processing, projection processing and calculation processing. For this purpose, the angle detecting device 12 has a communication interface (IF) 21, a memory 22 and a processor 23. The communication interface 21, memory 22 and processor 23 are connected via signal wires 24. The communication interface 21 has an interface circuit to connect the angle detecting device 12 with the in-vehicle network 13.

The memory 22 is an example of a memory unit, and it has a volatile semiconductor memory and a non-volatile semiconductor memory, for example. The memory 22 stores an application computer program and various data to be used for information processing carried out by the processor 23 of each device. The memory 22 also stores internal parameters such as the optical axis direction of the rear camera 3 and the focal length and viewing angle of the imaging optical system, and external parameters such as the mounting position of the rear camera 3.

All or some of the functions of the angle detecting device 12 are carried out by functional modules driven by a computer program operating on the processor 23, for example. The processor 23 has a detecting unit 231, a converting unit 232, a projecting unit 233 and a calculating unit 234. Alternatively, the functional module of the processor 23 may be a specialized computing circuit in the processor 23. The processor 23 comprises one or more CPUs (Central Processing Units) and their peripheral circuits. The processor 23 may also have other computing circuits such as a logical operation unit, numerical calculation unit or graphics processing unit. The angle detecting device 12 is an electronic control unit (ECU), for example. Operation of the angle detecting device 12 will be described in detail below.

For FIG. 3, the automatic control device 11 and the angle detecting device 12 were described as separate devices, but all or some of the devices may also be constructed as a single device.

Figure 4:
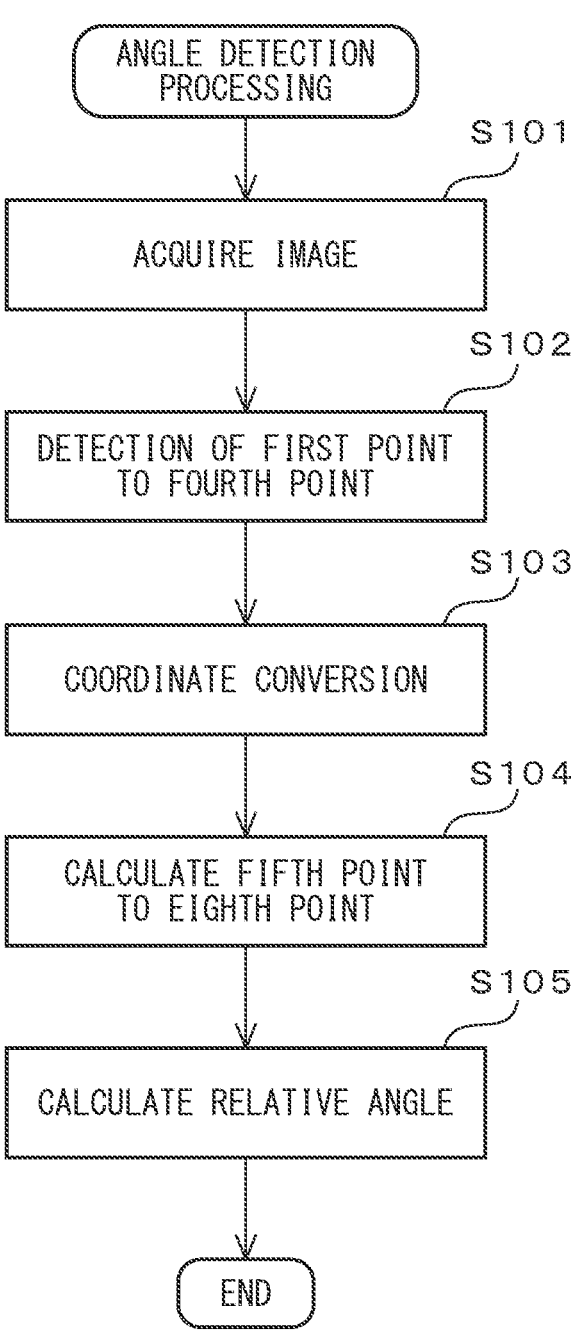
FIG. 4 is an example of an operation flow chart for angle detection processing by the angle detecting device of the embodiment.

FIG. 4 is an example of an operation flow chart for angle detection processing by the angle detecting device 12 of the embodiment. Angle detection processing by the angle detecting device 12 will be described below with reference to FIG. 4. The angle detecting device 12 carries out angle detection processing according to the operation flow chart shown in FIG. 4, at an angle detection time set with a predetermined cycle.

First, the detecting unit 231 acquires a rear image taken by the rear camera 3 (step S101). The rear image preferably includes the lower end of the back side 10a of the vehicle 10 and the lower end of the front side 30a of the towed vehicle 30.

The detecting unit 231 then detects, from the rear image, a first point P1 indicating part of the rear of the vehicle 10 that is within a first plane perpendicular to the longitudinal direction of the vehicle 10, a second point P2 indicating another part of the rear of the vehicle 10 that is within the first plane and at the same height from the ground as the first point P1, a third point P3 indicating part of the front of the towed vehicle 30 that is within a second plane perpendicular to the lengthwise direction of the connecting part 40 and a fourth point P4 indicating another part of the front of the towed vehicle 30 that is within the second plane and at the same height from the ground as the third point P3 (step S102).

The first point, second point, third point and fourth point are represented in the image coordinate system showing their locations within the rear image. The image coordinate system is represented by coordinates indicating each location on two intersecting axes, with the top left end of the rear image as the origin.

The detecting unit 231 has a classifier trained to identify, from the rear image, a first point indicating part of the rear of the towing vehicle 10 that is within the first plane perpendicular to the longitudinal direction of the vehicle 10, a second point indicating another part of the rear of the vehicle 10 that is within the first plane and at the same height from the ground as the first point, a third point indicating part of the front of the towed vehicle 30 that is within the second plane perpendicular to the lengthwise direction of the connecting part 40 and a fourth point indicating another part of the front of the towed vehicle 30 that is within the second plane and at the same height from the ground as the third point.

The detecting unit 231 detects the first point P1, second point P2, third point P3 and fourth point P4 by inputting the rear image into the classifier.

The classifier may use a deep neural network (DNN) that has been pretrained to detect the first point, second point, third point and fourth point represented in input images, for example.

The teacher images for training of the classifier may be images that include the location of the left end at the lower end of the back side of the towing vehicle, the location at the right end at the lower end of the back side of the towing vehicle, or the location at the center at the lower end of the back side of the towing vehicle, as the first point and second point, and that include the location at the left end at the lower end of the front side of the towed vehicle, the location at the right end at the lower end of the front side of the towed vehicle, or the location at the center at the lower end of the front side of the towed vehicle, as the third point and fourth point. The teacher images may also be images that include the location at the left end at the upper end of the front side of the towed vehicle, the location at the right end at the upper end of the front side of the towed vehicle, or the location at the center at the upper end of the front side of the towed vehicle, as the third point and fourth point. The first point and second point do not need to be symmetrically located from the center in the widthwise direction so long as they have the same height from the ground. Likewise, the third point and fourth point do not need to be symmetrically located from the center in the widthwise direction so long as they have the same height from the ground.

The method by which the detecting unit 231 detects the first point, second point, third point and fourth point is not limited to this method. For example, the rear image may be divided into upper, center and lower regions in the direction of height, with the first point and second point included in the lower region and the third point and fourth point included in the center region.

The detecting unit 231 extracts edges from the lower region of the rear image and detects straight lines forming the edges. The detecting unit 231 detects crossing locations where two straight lines forming the edges cross at a 90° angle. The detecting unit 231 may also detect a pair of crossing locations having a common straight line from among the two straight lines forming each crossing location, as the first point and second point.

Similarly, the detecting unit 231 extracts edges from the center region of the rear image and detects straight lines forming the edges. The detecting unit 231 detects crossing locations where two straight lines forming the edges cross at a 90° angle. The detecting unit 231 may also detect a pair of crossing locations having a common straight line from among the two straight lines forming each crossing location, as the third point and fourth point.

The converting unit 232 then converts the locations of the first point, second point, third point and fourth point represented in the image coordinate system, to locations in the world coordinate system with a predetermined reference location in real space as the origin (step S103). Coordinate conversion processing is described below with reference to FIG. 5.

The projecting unit 233 projects the first point, second point, third point and fourth point represented in the world coordinate system onto a projection plane parallel to the ground, to calculate a fifth point, sixth point, seventh point and eighth point corresponding to the first point, second point, third point and fourth point (step S104). The world coordinate system has a predetermined reference location in space as the origin, with the direction perpendicular to the ground as the z-axis and the two directions perpendicular to the z-axis as the x-axis and y-axis. For example, the location at the front end of the vehicle 10 may be used as the origin.

The projecting unit 233 may then calculate the projection plane, assuming that the vehicle 10 on which the rear camera 3 is mounted is located on a horizontal ground plane. The projection plane parallel to the ground in this case is selected to be the plane perpendicular to the z-axis. When the vehicle 10 is provided with a sensor that measures levelness, the projecting unit 233 may calculate the projection plane based on the measured levelness of the vehicle 10.

The projection plane may be the plane perpendicular to the plane which is perpendicular to the longitudinal direction of the vehicle 10, and perpendicular to the plane which includes the longitudinal direction of the vehicle 10. The projection plane can be set based on external parameters of the rear camera 3.

The calculating unit 234 then calculates the angle formed between a first straight line connecting the fifth point and sixth point and a second straight line connecting the seventh point and eighth point, in the projection plane, as the relative angle of the towed vehicle 30 with respect to the vehicle 10 (step S105), and the series of processing steps is complete. The calculating unit 234 is an example of an angle calculating unit. The calculating unit 234 outputs the relative angle to the automatic control device 11. Based on the relative angle, the automatic control device 11 controls operation of the vehicle 10 as it travels while towing the towed vehicle 30.

Figure 5:
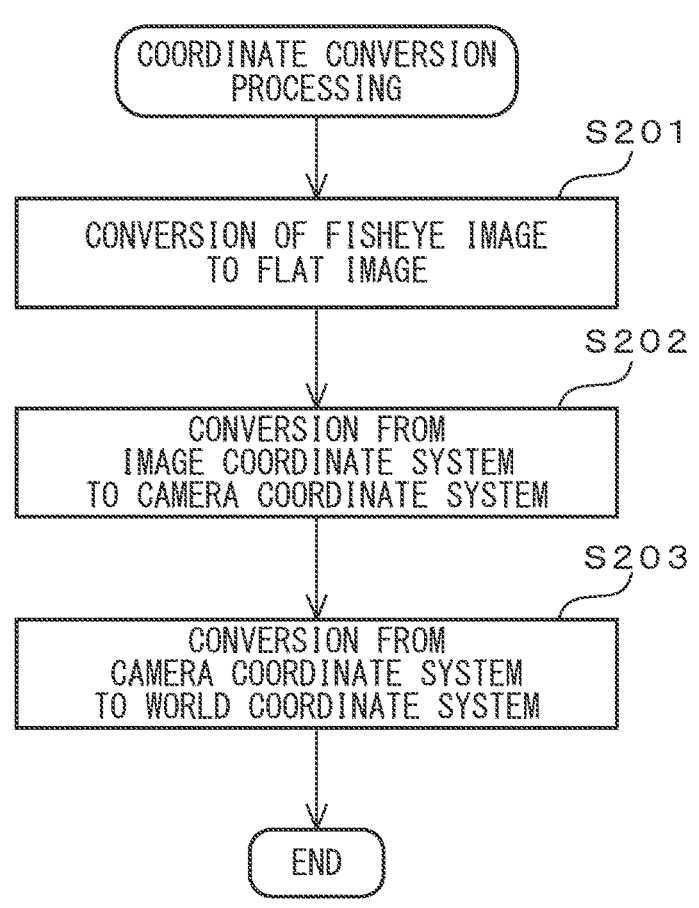
FIG. 5 is an example of an operation flow chart for coordinate conversion processing by the angle detecting device of the embodiment.

Coordinate conversion processing in step S103 will now be explained with reference to FIG. 5. FIG. 5 is an example of an operation flow chart for coordinate conversion processing by the angle detecting device 12 of the embodiment.

First, the converting unit 232 converts the rear image, which is a fisheye image, to a flat image (step S201). The technique for converting the fisheye image to a flat image may be any publicly known technique. The design data for the fisheye lens used for conversion is stored in the memory 22. When the rear camera 3 is not a fisheye camera, this processing is omitted.

The converting unit 232 then converts the locations of the first point, second point, third point and fourth point in the flat image, which are represented in the image coordinate system, to locations in the camera coordinate system (step S202). The camera coordinate system has the location of the rear camera 3 as the origin, with the optical axis direction of the rear camera 3 as one axial direction. The image coordinate system is aligned in the plane perpendicular to the optical axis direction of the rear camera 3. The conversion formula is obtained using internal parameters of the rear camera 3 and a projection matrix representing the projection. Since this conversion is conversion from two dimensions to three dimensions, it is preferred for the height coordinates used in the camera coordinate system to be the locations at the height of the lower end of the back side 10a of the vehicle 10 from the ground and at the height of the lower end of the front side 30a of the towed vehicle 30 from the ground. These heights can be represented in the camera coordinate system using internal parameters and external parameters of the rear camera 3. For conversion from the image coordinate system to the camera coordinate system, the locations on the flat image may be first converted from the image coordinate system to a normalized image system, and then converted to the camera coordinate system.

The converting unit 232 then converts the locations of the first point, second point, third point and fourth point represented in the camera coordinate system, to locations in the world coordinate system (step S203), and the series of processing steps is complete. The conversion formula is obtained as a combination between a rotation matrix representing rotation within the coordinate systems and a translation vector representing parallel movement within the coordinate systems. The conversion formula is obtained based on the current location of the vehicle 10 and external parameters. For conversion from the camera coordinate system to the world coordinate system, the locations in the camera coordinate system may be converted from the camera coordinate system to the vehicle coordinate system, and then converted to the world coordinate system.

The angle detection processing described above will now be explained with reference to FIG. 1B, FIG. 2 and FIG. 6.

FIG. 1B shows an example of a rear image. The rear image 100 shows the lower end of the back side 10a of the vehicle 10 and the lower end of the front side 30a of the towed vehicle 30.

The back side 10a of the vehicle 10 is an example of a first plane perpendicular to the longitudinal direction of the towing vehicle 10. The first point P1 and second point P2 are detected as locations at the left and right ends at the lower end of the back side 10a. The left and right ends at the lower end of the back side 10a are within the back side 10a. The left and right ends at the lower end of the back side 10a are at the same height from the ground.

The front side 30a of the towed vehicle 30 is an example of a second plane perpendicular to the lengthwise direction of the connecting part 40. The third point P3 and fourth point P4 are detected as locations at the left and right ends at the lower end of the front side 30a. The left and right ends at the lower end of the front side 30a are within the front side 30a. The left and right ends at the lower end of the front side 30a are at the same height from the ground.

Figure 6:
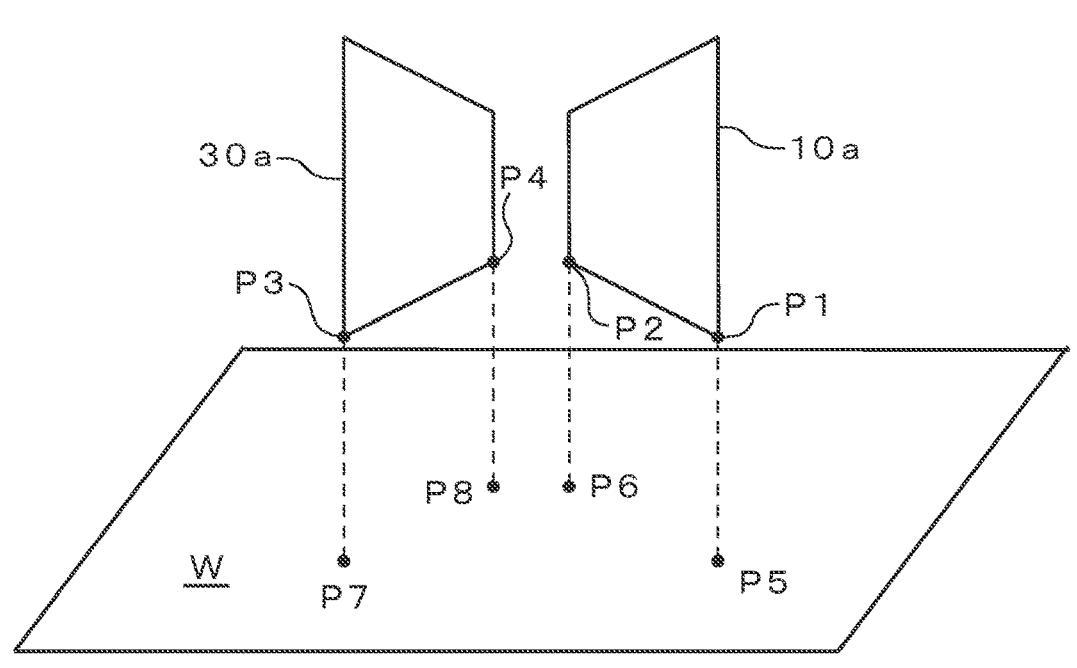
FIG. 6 is a diagram illustrating projection processing by the angle detecting device of the embodiment.

FIG. 6 is a diagram illustrating projection processing by the angle detecting device 12 of the embodiment. The first point P1, second point P2, third point P3 and fourth point P4 are represented on the world coordinate system. The first point P1 and second point P2 represent locations at the left and right ends of the lower end of the back side 10a of the vehicle 10. The third point P3 and fourth point P4 represent locations at the left and right ends of the lower end of the front side 30a of the towed vehicle 30.

In FIG. 6, the fifth point P5, sixth point P6, seventh point P7 and eighth point P8 represent points where the first point P1, second point P2, third point P3 and fourth point P4 represented in the world coordinate system are projected onto the projection plane W parallel to the ground. The fifth point P5, sixth point P6, seventh point P7 and eighth point P8 correspond to the first point P1, second point P2, third point P3 and fourth point P4.

As shown in FIG. 2, the calculating unit 234 obtains a first straight line L1 connecting the fifth point P5 and sixth point P6 within the projection plane W. The calculating unit 234 also obtains a second straight line L2 connecting the seventh point P7 and eighth point P8 within the projection plane W.

The calculating unit 234 calculates the interior angle θ formed between the first straight line L1 and the second straight line L2 at the intersection C between the first straight line L1 and second straight line L2, as the relative angle of the towed vehicle 30 with respect to the vehicle 10.

That the interior angle θ constitutes the relative angle of the towed vehicle 30 with respect to the vehicle 10 will now be explained. First, in FIG. 2, the midpoint of a line segment P5P6 connecting the fifth point P5 and sixth point P6 is designated as point Q. A straight line extended from point Q perpendicular to line segment P5P6 intersects with a line segment P7P8 connecting the seventh point P7 and eighth point P8, at a point S. The leg of the normal drawn to line segment P7P8 from point C is designated as point R. The slope of line segment QR connecting point Q and point R coincides with the lengthwise direction of the connecting part 40.

Since triangle SCQ and triangle SQR are right triangles, and ∠QSC of triangle SCQ and ∠RSQ of triangle SQR are the same angle, triangle SCQ and triangle SQR are in a similar relationship. Therefore, ∠SCQ of triangle SCQ and ∠SQR of triangle SQR are equal.

∠SQR is the relative angle of the towed vehicle 30 with respect to the vehicle 10, while ∠SCQ represents the interior angle θ. Therefore, the interior angle θ (∠SCQ) is the relative angle of the towed vehicle 30 with respect to vehicle 10.

As explained above, the angle detecting device of the embodiment can easily calculate the relative angle of the towed vehicle with respect to the towing vehicle based on a single image that includes the rear of the towing vehicle and the front of the towed vehicle.

The angle detecting device, computer program for angle detection and angle detecting method according to the embodiment described in the present disclosure may incorporate appropriate modifications that still fall within the gist of the disclosure. Moreover, the technical scope of the disclosure is not limited to these embodiments, and includes the invention and its equivalents as laid out in the Claims.

For example, for the embodiment described above the first point P1 and second point P2 were located at the left and right ends at the lower end of the rear of the towing vehicle, but the first point P1 and second point P2 may instead be two points from among the locations at the left and right ends of the lower end of the rear of the towing vehicle, and a location at the center of the lower end of the rear of the towing vehicle (for example, a location at the connecting part).

Moreover, for the embodiment described above the third point P3 and fourth point P4 were located at the left and right ends at the lower end of the front of the towed vehicle, but the third point P3 and fourth point P4 may instead be two points from among the locations at the left and right ends of the lower end of the front of the towed vehicle, and a location at the center of the lower end of the front of the towed vehicle (for example, a location at the connecting part).

The detecting unit may also detect three or more locations of the towing vehicle at the same height from the ground in a first plane, and three or more locations of the towed vehicle at the same height from the ground in a second plane, from an image that includes the rear of the towing vehicle and the front of the towed vehicle, and the calculating unit may calculate the angle of the towed vehicle with respect to the towing vehicle to be the angle formed between a first straight line connecting three or more locations and a second straight line connecting three or more locations, in the projection plane. The angle detecting device can thereby more precisely calculate the relative angle.

The invention claimed is:

1. An angle detecting device that calculates a relative angle between a towing vehicle and a towed vehicle which are connected in a rotatable manner via a connecting part provided on the towing vehicle, comprising:

a processor configured to detect a first point indicating part of rear of the towing vehicle within a first plane perpendicular to a longitudinal direction of the towing vehicle, a second point indicating another part of the rear of the towing vehicle within the first plane and at the same height from ground as the first point, a third point indicating part of front of the towed vehicle within a second plane perpendicular to a lengthwise direction of the connecting part, and a fourth point indicating another part of the front of the towed vehicle within the second plane and at the same height from the ground as the third point, from an image that includes the rear of the towing vehicle and the front of the towed vehicle, project the first point, second point, third point and fourth point detected onto a projection plane parallel to the ground and calculate a fifth point, sixth point, seventh point and eighth point corresponding to the first point, second point, third point and fourth point, and calculate an angle formed between a first straight line connecting the fifth point and sixth point and a second straight line connecting the seventh point and eighth point, in the projection plane, as the relative angle of the towed vehicle with respect to the towing vehicle.

2. The angle detecting device according to claim 1, wherein the processor is further configured to detect the first point, second point, third point and fourth point from the image using a classifier trained so as to identify from the image the first point indicating part of the rear of the towing vehicle within the first plane perpendicular to the longitudinal direction of the towing vehicle, the second point indicating another part of the rear of the towing vehicle within the first plane and at the same height from the ground as the first point, the third point indicating part of the front of the towed vehicle within the second plane perpendicular to the lengthwise direction of the connecting part and the fourth point indicating another part of the front of the towed vehicle within the second plane and at the same height from the ground as the third point.

3. The angle detecting device according to claim 1, wherein the first point and the second point represent locations at the lower end of the rear of the towing vehicle, and the processor is further configured to convert the first point, second point, third point and fourth point represented in an image coordinate system to the first point, second point, third point and fourth point represented in a camera coordinate system, using the heights of the locations at the lower end of the rear of the towing vehicle, and to convert the first point, second point, third point and fourth point represented in the camera coordinate system to the first point, second point, third point and fourth point represented in a world coordinate system, and then to project the first point, second point, third point and fourth point represented in the world coordinate system onto the projection plane and calculate the fifth point, sixth point, seventh point and eighth point.

4. A computer-readable, non-transitory storage medium storing a computer program for angle detection that calculates a relative angle between a towing vehicle and a towed vehicle which are connected in a rotatable manner via a connecting part provided on the towing vehicle, and causes a processor to execute a process and the process comprising:

detecting a first point indicating part of rear of the towing vehicle within a first plane perpendicular to a longitudinal direction of the towing vehicle, a second point indicating another part of the rear of the towing vehicle within the first plane and at the same height from ground as the first point, a third point indicating part of front of the towed vehicle within a second plane perpendicular to a lengthwise direction of the connecting part, and a fourth point indicating another part of the front of the towed vehicle within the second plane and at the same height from the ground as the third point, from an image that includes the rear of the towing vehicle and the front of the towed vehicle;

projecting the first point, second point, third point and fourth point onto a projection plane parallel to the ground and calculating a fifth point, sixth point, seventh point and eighth point corresponding to the first point, second point, third point and fourth point; and calculating an angle formed between a first straight line connecting the fifth point and sixth point and a second straight line connecting the seventh point and eighth point, in the projection plane, as the relative angle of the towed vehicle with respect to the towing vehicle.

5. An angle detecting method for calculating a relative angle between a towing vehicle and a towed vehicle which are connected in a rotatable manner via a connecting part provided on the towing vehicle, which is carried out by an angle detecting device and the method comprising:

detecting a first point indicating part of rear of the towing vehicle within a first plane perpendicular to a longitudinal direction of the towing vehicle, a second point indicating another part of the rear of the towing vehicle within the first plane and at the same height from ground as the first point, a third point indicating part of front of the towed vehicle within a second plane perpendicular to a lengthwise direction of the connecting part, and a fourth point indicating another part of the front of the towed vehicle within the second plane and at the same height from the ground as the third point, from an image that includes the rear of the towing vehicle and the front of the towed vehicle;

projecting the first point, second point, third point and fourth point onto a projection plane parallel to the ground and calculating a fifth point, sixth point, seventh point and eighth point corresponding to the first point, second point, third point and fourth point; and calculating an angle formed between a first straight line connecting the fifth point and sixth point and a second straight line connecting the seventh point and eighth point, in the projection plane, as the relative angle of the towed vehicle with respect to the towing vehicle.

\* \* \* \* \*